United States Patent Office

3,769,245
Patented Oct. 30, 1973

3,769,245
THERMOPLASTIC POLYURETHANE FOAM
Floyd D. Stewart, Akron, and Charles S. Schollenberger, Hudson, Ohio, assignors to The B. F. Goodrich Company, New York, N.Y.
No Drawing. Filed May 30, 1972, Ser. No. 257,697
Int. Cl. C08g 22/44
U.S. Cl. 260—2.5 AM    5 Claims

ABSTRACT OF THE DISCLOSURE

Essentially linear polyurethanes are prepared by the reaction of stoichiometrically balanced amounts of a linear hydroxyl terminated intermediate polymer resin, a glycol chain extender, and an organic diisocyanate. When a portion of the chain extender glycol is replaced by a carboxyl terminated material and proper catalyst is added, thermoplastic polyurethane foam structures are produced in the absence of water.

BACKGROUND OF THE INVENTION

Essentially linear polyesterurethanes and polyetherurethanes prepared by melt polymerization of components comprising (1) a linear hydroxyl terminated polyester, polyether or mixed polyester-polyether, (2) a chain extender glycol and (3) an aromatic diisocyanate wherein an essentially stoichiometric balance of hydroxyl and isocyanate terminal groups is employed and there are essentially no free hydoxyl or isocyanate groups present in the reaction product are known materials. They are prepared according to the teachings of U.S. Pats. 2,871,218 and 2,899,411. These polyurethanes are uncrosslinked, yet exhibit many properties of crosslinked polymers. They can be cast, molded, extruded into virtually any desired shape, or drawn to spandex type fibers and filaments. It is desired to make these very useful linear, uncrosslinked, thermoplastic polyurethanes available to the market in the form of foams. These foamed materials are useful as sound and vibration insulation material and to form oil resistant gaskets, clothing liners, and liners, soles and heels for shoes. They readily accept emboss of designs by the application of low heat and light pressure and are both heat and solvent sealable. Scrap is readily reclaimed and reworked.

Most polyurethane foams presently on the market are crosslinked, thermoset materials. Whether prepared by so called one shot processes or by multi-stage prepolymer techniques they are most often made by inclusion of water in the polymerization recipes. In these processes water is deliberately added as a reactant to the charge and reacts with isocyanate groups of the polyisocyanate component to generate carbon dioxide gas as a blowing agent and to create a porous, chemically crosslinked, cellular sponge or foam structure.

In the otherwise stoichiometrically balanced reactant charge for the essentially uncrosslinked polyurethanes of this invention, the inclusion of even small amounts of water, which reacts with and consumes isocyanate groups, upsets the reactant balance in the charge, producing polymer chains of shorter average length and poorer strength and toughness. A small amount of included water can be accommodated in the practice of this invention but it must be treated as a bi-functional reactant and balanced with a chemically equivalent amount, and not an excess, of the diisocyanate component. If diisocyanate in chemical excess of the organic reactants and included water is charged in practicing this invention then the foamed product will have some of the undesirable characteristics of a thermoset material, being less, if at all, heat or solvent sealable. Moreover, scrap will not be re-usable in important ways such as in making cements for adhesives and coatings, or by mechanically reforming as by milling, calendering, or extruding into sheets, tubes, fibers, etc. The foamed polyurethanes of this invention are distinctly different in composition, application methods, and recycle characteristics from other polyurethane foam materials.

SUMMARY OF THE INVENTION

The present invention discloses a catalyzed process for the preparation of a thermoplastic polyurethane cellular foam structure based on a uncrosslinked polymeric chain network prepared by polymerization of a stoichiometric balance of components comprising (1) linear hydroxyl terminated intermediate polymer, (2) a chain extender component consisting of a combination of a dicarboxylic acid and a chain extender glycol and (3) an organic diisocyanate. The cellular structure is achieved in the absence of all except adventitious water as an ingredient to react with isocyanate groups to generate carbon dioxide.

The linear hydroxyl terminated intermediate polymers are selected from polyesters including conventional structures and also polylactone glycol, poly(alkylene carbonate) glycols, and polyether glycols such as poly (alkylene oxide) glycols, polyacetal glycols, and poly(hydrocarbon) glycols such as poly(butadiene) glycol, and the like. The chain extender glycol materials are selected from the class of smaller or shorter chain glycols, and are used in combination with organic dicarboxylic acids in the practice of this invention. The isocyanate containing materials are selected from organic diisocyanates, including aromatic and aliphatic diisocyanates. The hydroxyl terminated intermediate polymers employed have an essentially linear structure and a molecular weight range from about 500 to 5,000, preferably between 750 and 3,500.

The hydroxyl-terminated polyester components of this invention may be of conventional structure such as are prepared by the esterification of a dicarboxylic acid such as adipic, succinic, and the like or their anhydrides, with an aliphatic glycol such as ethylene glycol, propanediol 1,4-butanediol, and the like. Preferred acids are those dicarboxylic acids of the formula HOOC—R—COOH where R is an alkylene radical containing 2 to 8 carbon atoms. Preferred glycols are those of the formula $HO(CH_2)_xOH$ wherein $x$ is 4 to 8. Molar ratios of more than 1 mole of glycol to acid are preferred so as to insure linear chains containing a preponderance of terminal hydroxyl groups. The polyester glycols also may be prepared by the proper initiation and polymerization of suitable lactones such as ε-caprolactone as described in Rubber World, 156, (3), pp. 53–57, June 1967, or by the condensation of diphenyl carbonate and an organic glycol as described in U.S. Pat. 3,509,233.

The hydroxyl (polyalkylene oxide)s, or polyethers, are essentially linear hydroxy-terminated compounds having ether linkages as the major linkage joining carbon atoms, such as those polyethers prepared by the clevage of a cyclic ether with a Lewis acid. They have the formula $HO[(CH_2)_nO]_x$ wherein $n$ is a number from 2 to 6 and $x$ is an integer.

The polyacetals are generally prepared by the reaction of an aldehyde and polyhydric alcohol with an excess of the alcohol, including for example, the reaction products of aldehydes such as formaldehyde, and the like reacted with glycols, such as ethylene glycol, and the like, which are well-known to those skilled in the art.

The poly(hydrocarbon) glycols may be prepared by the appropriately initiated and terminted free radical polymerization of diene monomers such as butadiene as described in Canadian Pat. No. 838,233.

Although any glycol chain extender material can be used, typical glycol compounds employed are aliphatic glycols, such as ethylene glycol, 1,4-butanediol, and the like. Cyclo-aliphatic glycols and glycols containing an aryl group may be used. The preferred short chain glycol chain extenders are those of the formula $HO(CH_2)_xOH$ wherein $x$ is an integer from 4 to 8.

All dicarboxylic organic acids are useful in the practice of the invention. Aliphatic, cycloaliphatic, aromatic and aromatic-aliphatic types can be employed. Specific dicarboxylic acids that are useful are oxalic, malonic, succinic, adipic, suberic, isophthalic and terephthalic acids.

Typical diisocyanate compounds employed are the aliphatic diisocyanates, such as tetramethylene diisocyanate, and hexamethylene diisocyanate; the cycloaliphatic diisocyanates, such as cyclohexyl diisocyanate; the aromatic diisocyanates, such as the phenyl diisocyanates, and the toluene diisocyanates; the dicycloaliphatic diisocyanates, such as dicyclohexyl methane diisocyanate; and the diaryl diisocyanates, such as diphenyl methane-p,p'-diisocyanate, dichloro-diphenyl methane diisocyanate, dimethyl diphenyl methane diisocyanate, diphenyl dimethyl methane diisocyanate, dibenzyl diisocyanate, and diphenyl ether diisocyanate.

The glycol chain extender, the dicarboxylic acid, the intermediate polymeric glycol reactant and the organic diisocyanate may be admixed directly if they are in the liquid state or melt mixed if some or all of them are solids.

The molar ratio of the reactant components described above is maintained so that the reaction product has essentially no free hydroxy, carboxyl or isocyanate groups. About 1 mole of the linear hydroxyl terminated intermediate polymer reactant (1) is reacted with from 0.1 to 15, preferably from 0.1 to 10 moles, of chain extender component (2) which is a combination of a glycol chain extender and a dicarboxylic acid. The amount of diisocyanate (3) is varied from about 1.0 to 16 moles, preferably from 1.1 to 11 moles, but always in an amount so that the number of equivalents of isocyanate will balance the sum of the available equivalents of hydroxyl and carboxyl groups.

It is important that the chain extender material component of this invention consists of a combination of a short chain glycol and a dicarboxylic acid and that the total of the moles of the combined glycol and acid be such that it equals 0.1 to 10 moles of the total charge as described above. The short chain extender glycol and acid can be in any proportions by weight to each other from 99 to 1 to 1 to 99. The higher the proportion of the dicarboxylic acid in the combination of glycol/dicarboxylic acid, the lower the density of the thermoplastic foam will be.

Catalysts have been found to be essential to successful working of this invention. Certain catalysts are known to favor the reaction of the carboxyl groups of the dicarboxylic acid with available isocyanate groups to generate carbon dioxide gas. The gas acts as the foaming agent to produce the foam or sponge structure. If no catalyst is present, carbonyl groups of the dicarboxylic acid do not react extensively enough with isocyanate groups and the polymer produced lacks the desired degree of porosity.

Active catalysts for the reaction include alkali metal and alkaline earth metal salts of organic acids including lithium, sodium, potassium, magnesium, calcium, barium, rubidium and cesium acetates, propionates, butyrates, isobutyrates, valerates, caproates, pelargonates, laurates, stearates, benzoates, naphthenates, adipates and sebacates and mixtures of the same. Salts of cobalt, iron, manganese and the many tertiary amines are also useful to catalyze this reaction.

Foam manufacturers desire to control the density of the foam produced. In this invention, foam density may be controlled by regulating the quantity of dicarboxylic acid added to the formulation, and by rebulating the polymerization temperature.

DETAILED DESCRIPTION OF THE INVENTION

Example 1

A random melt polymerization is conducted by mixing 1 mole of poly(tetramethylene adipate) glycol (mol wt. 1104, acid No. 2.1), 0.8 mole 1,4-butanediol, 0.2 mole adipic acid, 2.0 mols 4,4'-diphenylmethane diisocyanate and 0.003 weight percent on polymer of magnesium acetate in a vented autoclave with stirring for 2 minutes at atmospheric pressure at 150° to 155° C. Some gaseous $CO_2$ evolves during this stage of the polymerization reaction. The foamy liquid polymer is transferred to an open, Teflon lined pan and allowed to cool to room temperature. Foaming, evidenced by continued sample expansion during the initial cooling, continues in the tray. A high density foam 32.3 lbs./cu. ft. is produced. The 25% compression modulus run by ASTM (D1564) Method B, Suffix D, is 52.5 p.s.i.

When the procedure of Example 1 is repeated with all materials and conditions the same except that no catalyst is employed, no gas is generated during the reaction and the cooled polymer shows very few cells, pores or other voids when examined in cross section. This material has a 25% compression modulus of >250 p.s.i.

Example 2

The procedure of Example 1 is followed using the following reaction recipe:

| | Amount |
|---|---|
| Poly(tetramethylene adipate) glycol mol. wt. 1104, acid No. 2.1 _____mole__ | 1.0 |
| 1,4-butanediol _____do____ | 0.6 |
| Adipic acid _____ | 0.4 |
| 4,4'-diphenylmethane diisocyanate _____ | 2.0 |
| Magnesium acetate _____wt. percent__ | .003 |

The reaction mass generates carbon dioxide in the reactor and during the first stage of cooling in the pan. The foam has a lower density than the foam made in Example 1 (26.6 lbs./cu. ft.).

Example 3

The procedure of Example 2 is followed except that 0.4 mole of suberic acid is used to replace adipic acid. A uniform foam sponge forms which has a density of 27.7 lbs./cu. ft. and a 25% compression modulus of 30.5 p.s.i.

Samples of the foams produced in Examples 1, 2, and 3, each 1" x 2" in area are laid on a surface consisting of a woven cotton cloth warmed to 90°–160° C. The foam softens and bonds to cloth as the cloth cools. The samples of foam heat sealed to the cloth indicate the usefulness of the foam as a clothing liner material. Similar foam samples are brush coated with tetrahydrofuran. The solvent softens the surface of the foam and, when pressed to the cotton cloth, the cloth being at room temperature, the foam solvent bonds to the cloth.

We claim:
1. The method of preparing a thermoplastic polyurethane foam in the absence of water comprising polymerization of 1.0 mole of linear hydroxyl terminated intermediate polymer, 0.1 to 10 moles chain extender material, said material comprising a mixture of an organic glycol and an organic dicarboxylic acid in the weight ratio of 1–99 to 99–1, and a number of moles of an organic diisocyanate that is chemically equivalent to the number of moles of said linear hydroxyl terminated intermediate polymer plus said moles of glycol chain extender and the moles of said dicarboxylic acid in the presence of 0.001 to 0.5 weight percent based on weight of polymer of a catalyst for the carboxyl group-isocyanate group reaction.

2. The method of claim 1 wherein the said catalyst is magnesium acetate.

3. A heat and solvent sealable thermoplastic polyurethane foam having an overall density range of 1.5 to 50 lbs./cu. ft. said foam being formed in the absence of all except adventitious water by the random polymerization of 1.0 mole of a linear hydroxyl terminated intermediate polymer, 0.1 to 10 moles chain extender material, said material comprising a mixture of an organic glycol and an organic dicarboxylic acid in the weight ratio of 1–99 to 99–1, and a number of moles of an organic diisocyanate that is chemically equivalent to the number of moles of said linear hydroxyl terminated intermediate polymer plus said moles of glycol chain extender and the moles of said dicarboxylic acid plus the number of moles of said adventitious water in the presence of 0.001 to 0.5 weight percent based on the weight of polymer of a catalyst for the carboxyl group-isocyanate group reaction.

4. The thermoplastic polyurethane foam of claim 3 wherein the ratio of acid free glycol chain extender to said dicarboxylic acid is from 80:20 to 60:40.

5. The thermoplastic polyurethane foam of claim 4 wherein said linear hydroxyl terminated intermediate polymer is poly(tetramethylene adipate) glycol, said free glycol chain extender is 1,4-butanediol, said dicarboxylic acid is adipic acid, said diisocyanate is 4,4'-diphenylmethane diisocyanate and said catalyst is magnesium acetate.

References Cited
UNITED STATES PATENTS 3,489,696  1/1970  Miller _____ 260—2.5 AMA
3,562,189  2/1971  Farrissey _____ 260—2.5 AMA M. J. WELSH, Primary Examiner U.S. Cl. X.R.

260—77.5 AM